(12) United States Patent
Johanning et al.

(10) Patent No.: US 8,747,698 B2
(45) Date of Patent: Jun. 10, 2014

(54) METHOD OF STARTING UP AUTOTHERMAL REFORMING REACTORS

(75) Inventors: Joachim Johanning, Oberhausen (DE); Bernd Keil, Dortmund (DE)

(73) Assignee: Thyssenkrupp Uhde GmbH, Dortmund (DE)

( * ) Notice: Subject to any disclaimer, the term of this patent is extended or adjusted under 35 U.S.C. 154(b) by 0 days.

(21) Appl. No.: 14/005,497

(22) PCT Filed: Mar. 13, 2012

(86) PCT No.: PCT/EP2012/001108
§ 371 (c)(1),
(2), (4) Date: Sep. 16, 2013

(87) PCT Pub. No.: WO2012/123100
PCT Pub. Date: Sep. 20, 2012

(65) Prior Publication Data
US 2014/0001408 A1 Jan. 2, 2014

(30) Foreign Application Priority Data

Mar. 17, 2011 (DE) .......................... 10 2011 014 217

(51) Int. Cl.
*C01B 3/24* (2006.01)
(52) U.S. Cl.
USPC ....................................................... 252/373

(58) Field of Classification Search
None
See application file for complete search history.

(56) References Cited

U.S. PATENT DOCUMENTS

| 3,810,975 | A | 5/1974 | Brooke |
| 6,123,873 | A | 9/2000 | Primdahl |
| 2002/0094310 | A1* | 7/2002 | Krause et al. ................. 422/191 |
| 2004/0194384 | A1* | 10/2004 | Nguyen ....................... 48/197 R |
| 2004/0231616 | A1* | 11/2004 | Ellis et al. ......................... 123/3 |
| 2006/0216562 | A1 | 9/2006 | Edlund et al. |

OTHER PUBLICATIONS

"Start-Up of an Autothermal Reformer" Prepr. Pat.—Am. Chem. Soc., Div. Fuel Chem. (2004), vol. 49, Issue 2 S. Ahmed et al.*
"Diesel Fuel Reformer for Automotive Fuel Cell Applications" Int. J. Hydrogen Energy, vol. 34 (2009), pp. 3367-3381 B. Lindstrom et al.*
International Search Report for PCT/EP2012/001108, English translation attached to original, Both completed by the European Patent Office on Jul. 11, 2012, All together 5 Pages.

* cited by examiner

*Primary Examiner* — Melvin C Mayes
*Assistant Examiner* — Douglas Call
(74) *Attorney, Agent, or Firm* — Brooks Kushman P.C.

(57) ABSTRACT

A method of starting up an autothermal reactor for the production of synthesis gas by reforming of hydrocarbon-containing feed gases in a reaction chamber in which oxidation reactions and reforming reactions are carried out, by feeding a hydrocarbon containing feed gas, steam and an oxidant.

20 Claims, 1 Drawing Sheet

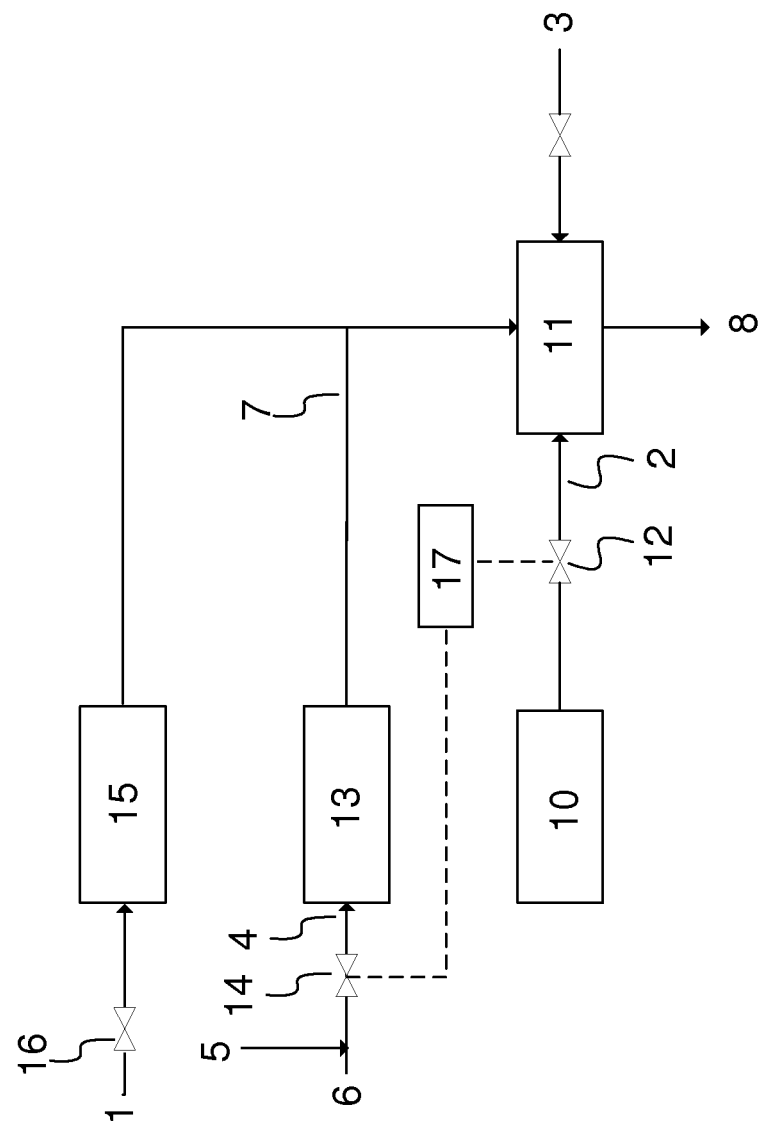

METHOD OF STARTING UP AUTOTHERMAL REFORMING REACTORS

CROSS-REFERENCE TO RELATED APPLICATION

This application is the U.S. national phase of PCT application No. PCT/EP2012/001108 filed on Mar. 13, 2012, which claims priority to German patent application No. 10 2011 014 217.7 filed on Mar. 17, 2011, the disclosures of which are incorporated in their entirety by reference herein.

The invention relates to a method for the commissioning of an autothermal reactor for the generation of synthesis gas by reforming hydrocarbon-containing feed gases in a reaction chamber where oxidation and reforming reactions take place, according to which a hydrocarbon-containing feed gas and water vapour are fed, with the water vapour content being 0-80% by vol. referred to the hydrocarbon-containing feed gas, as well as an oxidiser of an oxygen content of 10-100% by vol., and a product gas is generated, the commissioning being initiated by an ignition operation.

Autothermal reactors for the generation of synthesis gases by the reforming of natural gas require a temperature of >800° C. for obtaining a stable sustained reaction in the primary reaction zone in which the oxidiser and the feed gas which is a natural gas/water vapour mixture are brought into contact.

This high temperature level cannot be achieved alone by preheating the natural gas in customary fluid-heated heat exchangers. Such heat exchangers reach their limits of use for the fluids to be heated already at temperatures of approx. 600° C. This is due to the limitations specified for materials and the large differences in the thermal expansions of the individual components in the process vessels, in particular during start-up and shut-down. Moreover, during start-up of the reformers there are often no heat sources available that could provide the high temperatures.

Therefore, an ignition device is required to start the reaction. Normally, special start-up burners equipped with separate ignition devices are used for this purpose. After heating the reaction chamber the start-up burners must be removed in order to protect especially the ignition devices against the gas atmosphere existing in continuous operation and the permanently high temperatures. The removal of the burners requires depressurising the reactors after the pre-heating phases and thus entails quite time-consuming procedures.

Electric pre-heaters allow heating element temperatures of up to approx. 800° C. However, on account of the necessary temperature differences between the heating elements and the gas for transferring the heat to the process gas and the unavoidable heat losses until entry into the reactor the temperature which can actually be achieved inside the reactor is always considerably lower than the heating element temperature. Moreover, experience has shown that the temperature actually prevailing in the reactors follows the outlet temperature of the pre-heaters in a very tentative manner only. The reason for this is the heat absorption capacity of the feed lines and of the ceramic lining of the reactor. Due to these conditions the ignition temperature required for natural gas cannot be achieved in small-sized reactors with specifically large surface losses. It is also doubtful that in the case of large plant capacities this is possible with the aid of electric pre-heaters alone. In any case, the long heating phases and the large electric energy demand result in a very inefficient method. Reactor-internal electric pre-heaters would have to be removed at the end of the preheating period—similar to the start-up burners.

U.S. Pat. No. 6,123,873 describes a method for the commissioning of an autothermal reformer, in which a gas consisting of methanol and water vapour is brought into contact with a methanation catalyst, the gas having a temperature which is adequately high to initiate a decomposition reaction of the methanol to hydrogen and carbon monoxide including further heating and in which the hot gas is subsequently fed to an autothermal reformer, the latter being heated to a temperature which is sufficient to start and maintain a reforming reaction. However, with this solution the technical effort for achieving the required ignition temperature is very high.

Hence, the objective of the present invention is to provide an alternative method which is as simple as possible in terms of equipment and allows ensuring commissioning without the necessity of starting up and shutting down again the autothermal reactor in a time-consuming way.

The objective is achieved by a method for the commissioning of an autothermal reactor for the generation of synthesis gas by reforming hydrocarbon-containing feed gases in a reaction chamber where oxidation and reforming reactions take place, according to which a hydrocarbon-containing feed gas and water vapour are fed, with the water vapour content being 0-80% by vol. referred to the hydrocarbon-containing feed gas, as well as an oxidiser of an oxygen content of 10-100% by vol. and a product gas is generated, with the autothermal reactor first being pre-heated to >600° C. for commissioning by means of an inert fluid, and the ignition operation then bring triggered by feeding a gas or gas mixture of an adequately low ignition temperature which is below the ignition temperature of the hydrocarbon-containing feed gas, and the content of the component of low ignition temperature in said gas/gas mixture being at least 40% by vol., and by feeding an oxidiser of an oxygen content of 10-100% by vol., and autothermal reforming then being started by feeding the hydrocarbon-containing feed gas and water vapour.

The higher hydrocarbons, in particular, can here be used as gases or gas mixtures of high reactivity, i.e. with ignition at a low temperature, their ignition temperatures being considerably below those of methane and being known as decreasing with increasing chain length. At the same time, however, the selection of the gas is a compromise regarding the formation of soot inside the reactor, said soot formation increasing with the chain length. Especially critical in this respect are the unsaturated hydrocarbons, for example, and are thus not suitable. Therefore, a good compromise is the use of propane or a propane-containing gas mixture, such as a propane/butane gas mixture, of a propane content of at least 40% by vol.

The propane-containing gas mixture is preferably supplied from a storage tank.

A non-reacting gas, such as nitrogen or carbon dioxide, or water vapour, as the case may be, is advantageously used as inert fluid for the pre-heating of the reactor.

The commissioning is advantageously carried out at a pressure of 1-10 bar abs., preferably at a pressure of 1-5 bar abs. As the start-up operation is carried out at reduced pressure as compared to the autothermal reforming reaction which is carried out at pressures of approx. 20 to 100 bar, and requires only a short period of time, the quantities of gases or gas mixtures of low ignition temperature required for that purpose are moderate even in the case of large-sized reactors.

By this commissioning method it is possible to avoid the enormous technical effort for reaching the ignition temperature of natural gas, i.e. essentially of methane. In contrast to this, the additional feed devices used for the gas mixture of low ignition temperature containing, for example, propane and required for the inventive commissioning method can be implemented at a considerably lower technical effort, i.e.

costs, and can be designed almost completely separately from the main supply line of the natural gas/water vapour mixture.

In a preferred embodiment of the inventive method the gas mixture of low ignition temperature containing, for example, propane and the hydrocarbon-containing feed gas are each fed to the reactor via separate feed lines.

In a further embodiment the feed lines of the gas or gas mixture of low ignition temperature and the hydrocarbon-containing feed gas are interlocked via valves, preventing backflow of the hydrocarbon-containing feed gas of a higher pressure than the gas mixture of low ignition temperature containing, for example, propane into the feed line of the feed gas of low ignition temperature by interlocking the valves against each other by means of a suitable control unit and thus preventing maloperation by the operating personnel.

The invention is described in more detail below by means of FIG. 1.

FIG. 1: Simplified arrangement drawing illustrating a method for the inventive commissioning of autothermal reforming reactions.

As regards the arrangement drawing shown in FIG. 1 the autothermal reactor is brought to a temperature of >600° C. by means of an inert fluid 1 in a first step, said fluid then being discharged from autothermal reactor 11 via line 8. For this purpose, inert fluid 1 passes through pre-heater 15. As soon as the desired temperature is reached in autothermal reactor 11, this pre-heating is stopped, valve 16 closed and a propane-containing gas stream 2 of low ignition temperature supplied from a storage tank 10 into autothermal reformer 11. In so doing, valve 12 is open. The pressure of gas stream 2 of low ignition temperature ranges between 1 and 10 bar. In addition, an oxidiser 3 of an oxygen content of 10-100% by vol. is fed to autothermal reactor 11. Once the ignition operation has been completed, this state of operation is maintained for an adequate period of time until a reactor temperature of >800° C. has been reached. Then, valve 12 is closed and, by opening valve 14, a hydrocarbon-containing water vapour/feed gas mixture 4, which has a water vapour content of 0-80% by vol. and has been generated by mixing water vapour 5 and hydrocarbon-containing feed gas 6, is fed into a natural gas/water vapour pre-heater 13. There, the mixture is brought to a temperature of 500-800° C. and then fed to autothermal reactor 11. With regard to the mechanical and thermal load of the reactor brick-lining it is appropriate to feed the heated hydrocarbon-containing water vapour/feed gas mixture 7 at low pressure first, the pressure level being comparable to that of gas stream 2 of low ignition temperature, and to then slowly increase the pressure to the desired operating value of 15-100 bar. To prevent backflow of the heated hydrocarbon-containing water vapour/feed gas mixture 7, valves 12 and 14 are interlocked against each other via control unit 17 in such a way that when the hydrocarbon-containing feed gas is supplied and valve 14 opened accordingly, valve 12 closes preventing further feed of gas stream 2 of low ignition temperature. Then, the autothermal reactor is operated as known from the state of the art and a generated raw synthesis gas is discharged via line 8.

Advantages resulting from the invention for the commissioning of an autothermal reactor:

No time-consuming start-up and re-shut-down procedures of the autothermal reactor, i.e. significant saving in time when starting the reactor from cold condition.

Process which can easily be integrated into existing plants.

No additional units, such as start-up or ignition burners, required.

The highly flammable fluids required are available virtually all over the world and can therefore be procured easily, quickly and at low cost.

LIST OF REFERENCE NUMBERS AND DESIGNATIONS

1 Inert fluid
2 Gas stream of low ignition temperature
3 Oxidiser
4 Hydrocarbon-containing water vapour/feed gas mixture
5 Water vapour
6 Hydrocarbon-containing feed gas
7 Heated hydrocarbon-containing water vapour/feed gas mixture
8 Raw synthesis gas
10 Storage tank for gas of low ignition temperature
11 Autothermal reactor
12 Valve
13 Natural gas/water vapour pre-heater
14 Valve
15 Electrically heated pre-heater
16 Valve
17 Control unit

The invention claimed is:

1. A method for the commissioning of an autothermal reactor for the generation of synthesis gas by reforming hydrocarbon-containing feed gases in a reaction chamber where oxidation and reforming reactions take place, into which a hydrocarbon-containing feed gas and water vapour are fed, with the water vapour content being 0-80% by vol. referred to the hydrocarbon-containing feed gas, as well as an oxidizer of an oxygen content of 10-100% by vol., and a product gas is generated, the commissioning being initiated by an ignition operation, comprising:
   preheating the autothermal reactor to >600° C. for commissioning by means of an inert fluid;
   an ignition operation is then triggered by feeding a combustible gas or gas mixture having an ignition temperature below 600° C. and which is below the ignition temperature of the hydrocarbon-containing feed gas, the content of a heating component in the gas or gas mixture being at least 40% by vol. and feeding an oxidizer of an oxygen content of 10-100% by vol.; and
   autothermal reforming is then started by feeding the hydrocarbon-containing feed gas and water vapour to the reactor.

2. The method according to claim 1, wherein the commissioning is carried out at a pressure of 1-10 bar abs.

3. The method according to claim 2, wherein the gas or gas mixture containing a heating gas component and the hydrocarbon-containing feed gas are each fed to the reactor via separate feed lines.

4. The method according to claim 2 wherein the gas or gas mixture having an ignition temperature below 600° C. comprises propane.

5. The method according to claim 2 wherein a gas selected from the group consisting of nitrogen, carbon dioxide and water vapour and mixtures thereof, is used as inert fluid for the pre-heating of the reactor.

6. The method according to claim 2 wherein the gas or gas mixture is supplied from a storage tank.

7. The method according to claim 1, wherein the gas or gas mixture and the hydrocarbon-containing feed gas are each fed to the reactor via separate feed lines.

8. The method according to claim 7, wherein the feed lines of the gas or gas mixture and the hydrocarbon-containing feed gas are interlocked via valves, preventing backflow of the hydrocarbon-containing feed gas of a higher pressure than the gas mixture into the feed line of the gas or gas mixture temperature by interlocking the valves against each other by means of a control unit.

9. The method according to claim 8 wherein the gas or gas mixture having an ignition temperature below 600° C. comprises propane.

10. The method according to claim 8 wherein a gas selected from the group consisting of nitrogen, carbon dioxide and water vapour and mixtures thereof, is used as inert fluid for the pre-heating of the reactor.

11. The method according to claim 8 wherein the gas or gas mixture is supplied from a storage tank.

12. The method according to claim 7 wherein the gas or gas mixture having an ignition temperature below 600° C. comprises propane.

13. The method according to claim 7 wherein a gas selected from the group consisting of nitrogen, carbon dioxide and water vapour and mixtures thereof, is used as inert fluid for the pre-heating of the reactor.

14. The method according to claim 7 wherein the gas or gas mixture is supplied from a storage tank.

15. The method according to claim 1 wherein the gas or gas mixture having an ignition temperature below 600° C. comprises propane.

16. The method according to claim 15 wherein a gas selected from the group consisting of nitrogen, carbon dioxide and water vapour and mixtures thereof, is used as inert fluid for the pre-heating of the reactor.

17. The method according to claim 15 wherein the gas or gas mixture is supplied from a storage tank.

18. The method according to claim 1 wherein a gas selected from the group of nitrogen, carbon dioxide and water vapour is used as inert fluid for the pre-heating of the reactor.

19. The method according to claim 18 wherein the gas or gas mixture is supplied from a storage tank.

20. The method according to claim 1 wherein the gas or gas mixture of low ignition temperature is supplied from a storage tank.

* * * * *